(12) United States Patent
Lortz et al.

(10) Patent No.: US 9,361,465 B2
(45) Date of Patent: Jun. 7, 2016

(54) PRIVACY-ENHANCED CAR DATA DISTRIBUTION

(75) Inventors: Victor B. Lortz, Beaverton, OR (US); Anand P. Rangarajan, Hillsboro, OR (US); Xingang Guo, Portland, OR (US); Somya Rathi, Portland, OR (US); Vijay Sarathi Kesavan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 13/993,390

(22) PCT Filed: Dec. 28, 2011

(86) PCT No.: PCT/US2011/067452
§ 371 (c)(1),
(2), (4) Date: Jun. 12, 2013

(87) PCT Pub. No.: WO2013/100922
PCT Pub. Date: Jul. 4, 2013

(65) Prior Publication Data
US 2014/0059694 A1   Feb. 27, 2014

(51) Int. Cl.
| | |
|---|---|
| H04L 29/00 | (2006.01) |
| G06F 21/60 | (2013.01) |
| H04L 29/06 | (2006.01) |
| G06F 21/62 | (2013.01) |
| G06F 7/04 | (2006.01) |
| G06F 17/30 | (2006.01) |
| H04N 7/16 | (2011.01) |

(52) U.S. Cl.
CPC ............ *G06F 21/60* (2013.01); *G06F 21/6245* (2013.01); *H04L 63/0421* (2013.01); *H04L 63/105* (2013.01); *H04L 63/12* (2013.01); *H04L 63/126* (2013.01)

(58) Field of Classification Search
None
See application file for complete search history.

(56) References Cited

U.S. PATENT DOCUMENTS

| | | | | |
|---|---|---|---|---|
| 7,715,961 | B1 * | 5/2010 | Kargupta | 701/29.3 |
| 7,742,603 | B2 * | 6/2010 | Tengler et al. | 380/270 |
| 8,397,063 | B2 * | 3/2013 | DiCrescenzo | 713/158 |
| 2003/0028298 | A1 * | 2/2003 | Macky et al. | 701/35 |
| 2007/0223702 | A1 * | 9/2007 | Tengler et al. | 380/270 |
| 2010/0031025 | A1 * | 2/2010 | Zhang et al. | 713/156 |

OTHER PUBLICATIONS

PCT International Search Report and Written Opinion issued in corresponding PCT/US2011/067452 dated Sep. 25, 2012 (9 pages).

* cited by examiner

*Primary Examiner* — Shin-Hon Chen
(74) *Attorney, Agent, or Firm* — Trop, Pruner & Hu, P.C.

(57) ABSTRACT

In accordance with some embodiments, data may be collected from vehicles, and then reported to various subscribers with different levels of access privileges and pursuant different levels of security. In some embodiments, the data may be authenticated by a cloud service without revealing the identity of vehicle owner. This may provide enhanced privacy. At the same time, some types of the data may be encrypted for security and privacy reasons. Different information may be provided under different circumstances to different subscribers, such as the government, family members, location based services providers, etc.

10 Claims, 3 Drawing Sheets

PRIVACY-ENHANCED CAR DATA DISTRIBUTION

BACKGROUND

This relates generally to the collection of information from motor vehicles.

A number of services collect information from motor vehicles such as the time between oil changes, whether any mechanical failures are detected, tire air pressure and the like. Examples of such services are General Motors OnStar®, Nissan Car Wings®, and Ford Sync® services. These services collect information at run time from a wireless phone or Internet connected vehicles and make that information available for analysis.

The U.S. Department of Transportation's Intellidrive proposal for networked communications among vehicle sharing is based on sharing vehicle mined data using X.509 credentials and large numbers of certificates of authority.

There are a wide range of reasons why vehicle harvested data may be important. Global positioning system, speedometer, and odometer sensor data may be collected from vehicles and used for things like usage based taxation, speed limit enforcement, location based services and advertisements, real time traffic flow analysis, private investigation services, safety and family communication.

BRIEF DESCRIPTION OF THE DRAWINGS

Some embodiments are described with respect to the following figures.

DETAILED DESCRIPTION

In accordance with some embodiments, data may be collected from vehicles, and then reported to various subscribers with different levels of access privileges and pursuant different levels of security. In some embodiments, the data may be authenticated by a cloud service without revealing the identity of vehicle owner. This may provide enhanced privacy. At the same time, some types of the data may be encrypted for security and privacy reasons. Different information may be provided under different circumstances to different subscribers, such as the government, family members, location based services providers, etc.

Figure 1:
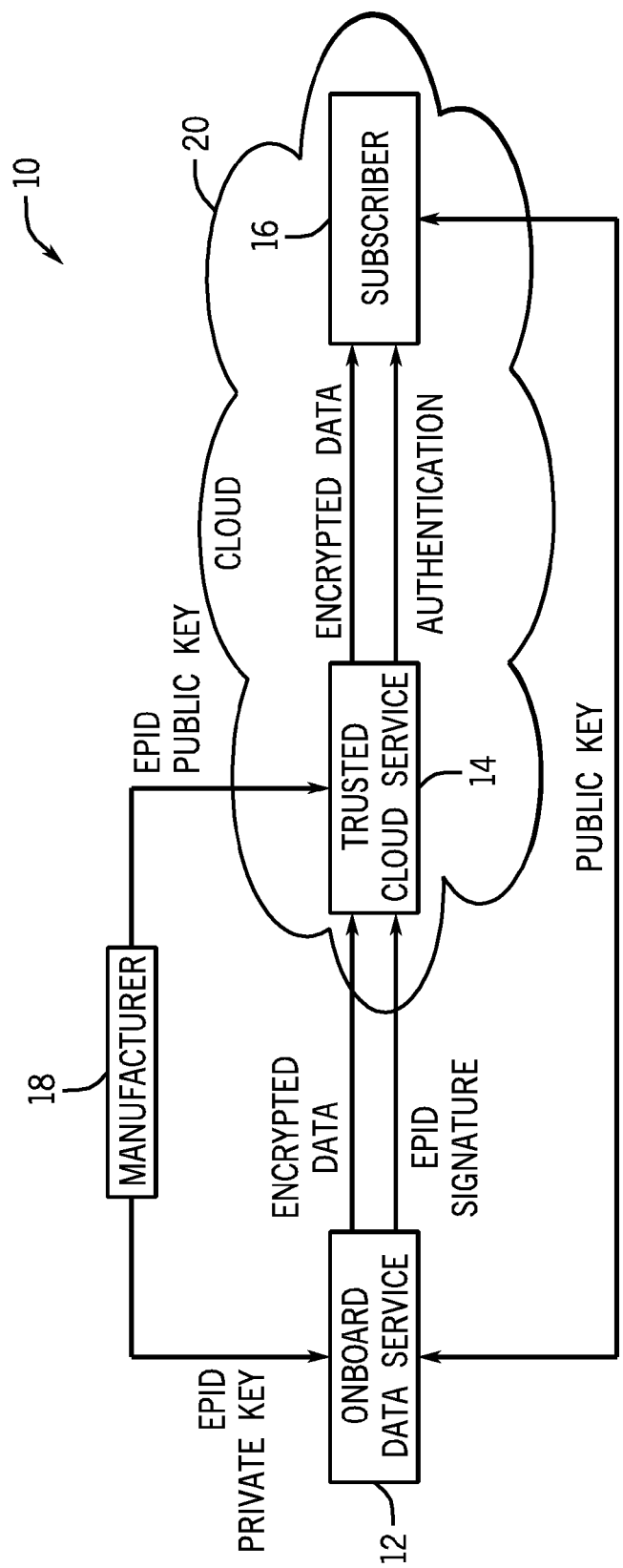
FIG. 1 is a schematic depiction of one embodiment to the present invention.

Referring to FIG. 1, a data collection system 10 may include an onboard data service 12 that includes a module resident within a motor vehicle. In some embodiments it may be part of an in-vehicle infotainment system that provides various services such as playing music, computer access and other entertainment options. The onboard data service 12 may be an add-on to an in-vehicle infotainment system that handles the provisioning of vehicle collected data to outside services called subscribers herein.

The potential subscribers for vehicle information are varied. One type of subscriber may be a government agency that may want vehicle information for a variety of purposes including statistics gathering, traffic management, motor vehicle law enforcement, taxation, or for other police functions. Other subscribers may be family members who want information about where a particular family member may be at any particular time. Similarly, location based services providers that provide location-based services or advertising may need to know the current position of the vehicle.

In some embodiments, the subscribers may sign a subscription agreement with the trusted cloud service 14, the vehicle manufacturer or some combination of those entities. The subscription agreement determines what if any compensation the vehicle owner receives, what information may be harvested, and the conditions under which the information may be harvested as well as any security protocols that may be required. The subscription agreement may come as part of the provision of the onboard data service 12 or the apparatus that it is incorporated in. Thus, the onboard data service may include hardware modules that are programmed initially to automatically provide certain data to certain preordained subscribers. It may also be programmable after the vehicle has been acquired by the owner by remote access over a wireless protocol. The programming may permit the addition of additional data types under particular circumstances to existing subscribers or the addition of new subscribers. In some cases, the vehicle owner may be advised of changes in the subscriber arrangements. Thus different subscribers may get different types of information under different circumstances and using different security provisions.

The onboard data service 12 may provide encrypted data to a trusted cloud service in a cloud 20. The trusted cloud service 14 may also receive a signature. The signature may be an enhanced privacy identifier (EPID) based authentication that the onboard data service 12 is an authentic device and is not providing improper or unreliable data.

The EPID signature may be the result of a manufacturer or other provider of an onboard data service equipment providing a private key to that service 12. The manufacturer 18 may also provide a public key to the trusted cloud service 14. Thus the onboard data service 12 may sign data with the private key and the trusted cloud service 14 may use the public key to ensure that the information has come from a trusted source.

Namely, the trusted cloud service can confirm that the source is hardware designed and authorized to provide reliable data because the onboard data service has the private key only provided to authorized devices. The authorized devices may be certified by the manufacturer to meet pertinent specifications such as reliability or security specifications as well as standards of disclosure to vehicle owners about the subscription arrangement.

Generally the information collected by the onboard data service 12 is provided to the trusted cloud service 14 using a variety of links. The links may be wireless links such as a Wi-MAX link, a Wi-Fi link, a satellite link or a cellular telephone link. The information transmission may be event driven or periodic.

The trusted cloud service 14 may then provide the encrypted or unencrypted data 14 to the correct subscriber 16 that has properly subscribed to receive that encrypted data service. In some embodiments, the trusted cloud service does not decrypt the data. The trusted cloud service 14 may also forward on the EPID signature to the appropriate subscriber 16 as indicated in FIG. 1. Then the subscriber may handle the public key authorization.

The subscriber 16 may be the one that provides a public key to the onboard data service 12 to facilitate the encryption of the data in one embodiment. The public key may use, for example a public key encoder such as an Rivest, Shamir, and Adleman (RSA) or EC algorithm public key encoder. In some embodiments, the subscriber 16 may perform the EPID authentication using an EPID public key provided by the manufacturer 18.

Figure 2:
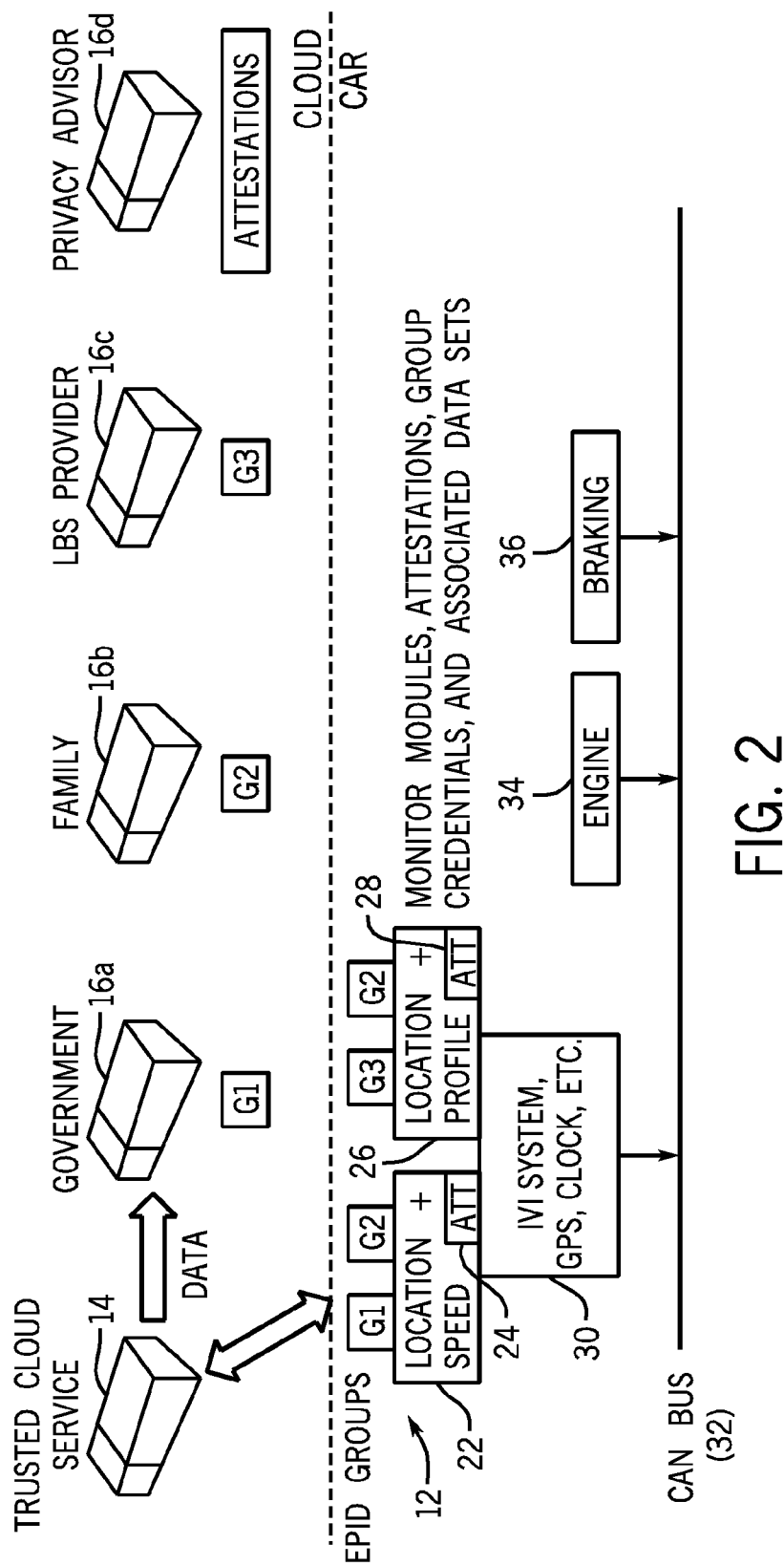
FIG. 2 is a more detailed description of a portion of the system shown in FIG. 1.

Referring next to FIG. 2, everything above the dotted line may be part of the cloud in one embodiment. While a cloud is suggested in FIG. 2, in other embodiments, various functions attributed to the cloud may be implemented by any server or computer. The cloud may include the trusted cloud service 14, a government subscriber 16a, a family subscriber 16b, a location based services provider 16c, and a privacy subscriber 16d in one embodiment.

The trusted cloud service 14 may provide particular data to each specific subscriber based on subscription agreements. For example, the data G1 is provided to the government, the data G2 is provided to the family member, and the data G3 is provided to a location based services provider.

As shown in FIG. 2, the modules attached to the in-vehicle infotainment system 30 correspond generally to onboard data service 12. One module 22 may collect location and speed information for example and another module 26 may collect location and user profile information. An attestation unit 24 or 28 may be provided in each of these modules. Thus location and speed information may end up in a data packages G1 and G2; and the location and profile information may end up in a data packages G3 and G2. Those data packages are forwarded to the trusted cloud service 14 either in encrypted form, if necessary, or as desired. The data packages may also include EPID authentication information in some embodiments. The contents of the packages may be determined from settings provided to the onboard data service. The number of packages may also be programmed into the service 14 together with information about who are the subscribers for each package.

In some embodiments, the assignment of sensor data to packages (in turn assigned to specific subscribers) may be handled entirely within the cloud such as by the trusted cloud service 14 instead of doing it in the onboard data service. In such case, the information in raw form or as processed as desired may be sent to the cloud where it is then identified using identifiers associated with the data to determine which sensor provided the data, which vehicle provided the data, and any other information and then it can be assembled into packages. Then the packages may be associated with subscribers all in a cloud or other facility remote from the vehicle itself.

The source of collected information may be identified in a variety of different ways. Source identification is used by the service 14 to provide the right data to the right subscriber. The data service 14 may have a table that indicates which information goes to which subscriber and in what format. The specified format may be a type of encryption and/or a particular organization of the data. In one embodiment, different types of sensor data may be accompanied by an identifier that identifies the data. The controller area network (CAN) bus 32 is event driven and each message is provided with an identifier as to its source or type. Other identification modalities can also be used, independent of those provided by the CAN bus.

The in-vehicle infotainment system may collect various information such as current time, global positioning system coordinates, as well as other information from the CAN bus 32 such as odometer sensor data, speedometer data and other such information. The CAN bus 32 is also connected to the vehicle engine computer 34 and a braking computer 36.

Each of the modules 22 and 26 maintains a certified attestation of the specific collected data and how that data is anonymized. The car owner can review an attestation any time and revoke the reporting privileges of any corresponding monitoring module in the system. The attestation units 24 and 28 themselves can also be treated as a kind of sensor data that the car owner can provide to an independent car privacy monitoring service 16d that specializes in analyzing the privacy implications of monitor modules subscriptions. In this way, a car owner who is not knowledgeable about such matters can receive expert advice to determine if the car owner should approve a request for information by a third party subscriber. Car owners can also establish very high level default policies based on privacy monitor service ratings that reflect their personal preferences for privacy. This approach can make the problem of deciding which request to grant and which request to deny more manageable for unsophisticated users.

The onboard data service 12 (FIG. 1) may provide mechanisms and monitor modules to receive EPID credentials corresponding to groups established by third party subscribers. By centralizing the EPID management in the car system, the onboard data service can provide greater assurance that monitor modules are not violating the privacy expressed in the attestation.

The attestation of each monitor module includes a declarative representation of the data collected by that module. Typically, this representation is expressed as a character string containing a database query. However, the onboard data service can satisfy the requests in other ways without literally executing the query in the attestation against an actual database engine at run time, due to a performance/security considerations.

By using EPID credentials, vehicles can attest to the authenticity of the data they collect without revealing the specific identity of the car or its owner. The data consumer referred to a subscriber described here can verify that the data it was signed by a member of a group that administers, but the subscriber is unable to determine which member actually generated the signature.

Figure 3:
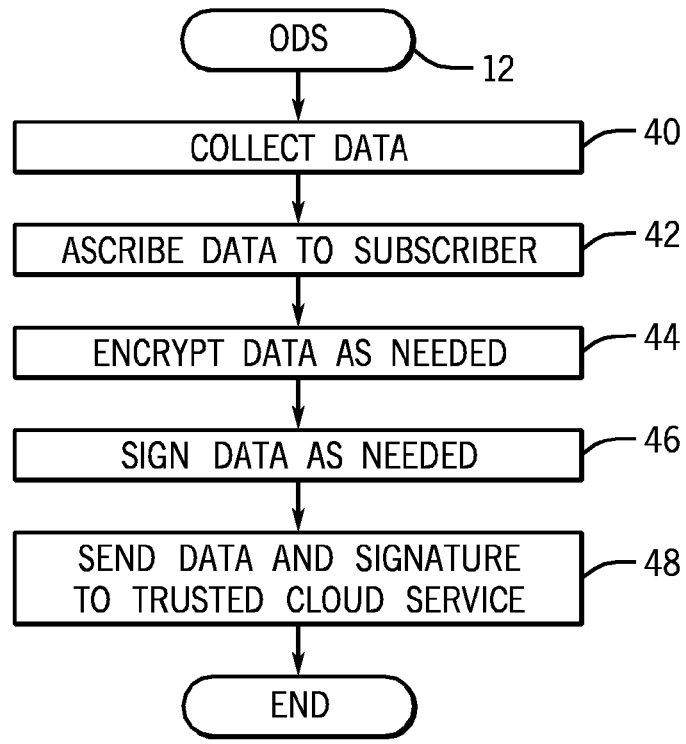
FIG. 3 is a flow chart for an onboard data service in accordance with one embodiment.

Referring to FIG. 3, a sequence for implementing an onboard data service (ODS) 12 may be implemented in software, firmware and/or hardware. In software and firmware embodiments it may be implemented by computer executed instructions stored in a non-transitory computer readable medium such as a semiconductor, optical or magnetic storage.

The sequence may begin by collecting the data (block 40) in the various monitor modules from the various data sensors as required by subscriber request. The data collected may be ascribed to each of the subscribers as indicated in block 42. In some cases, the same data may go to multiple subscribers.

Next the data may be encrypted or not as required as indicated block 44. Some subscribers may offer or demand encryption and in such cases, data presented to those subscribers may be encrypted. Similarly in some cases authentication of the data may be required and in such cases, the data may be signed using the manufacturer's supplied EPID private key as indicated in block 46. Thereafter, the data and signature information is sent to the trusted cloud service 14 as indicated in block 48. It may be processed in some cases in the trusted cloud service 14, and in other cases it is simply sent on to appropriate subscribers.

In some cases the data may have address information appended to it or other identifiers so that the trusted cloud service can determine who the appropriate subscriber is. And still in other embodiments, tags may indicate the type of data and the destination of the data then may be determined by the trusted cloud service 14.

Figure 4:
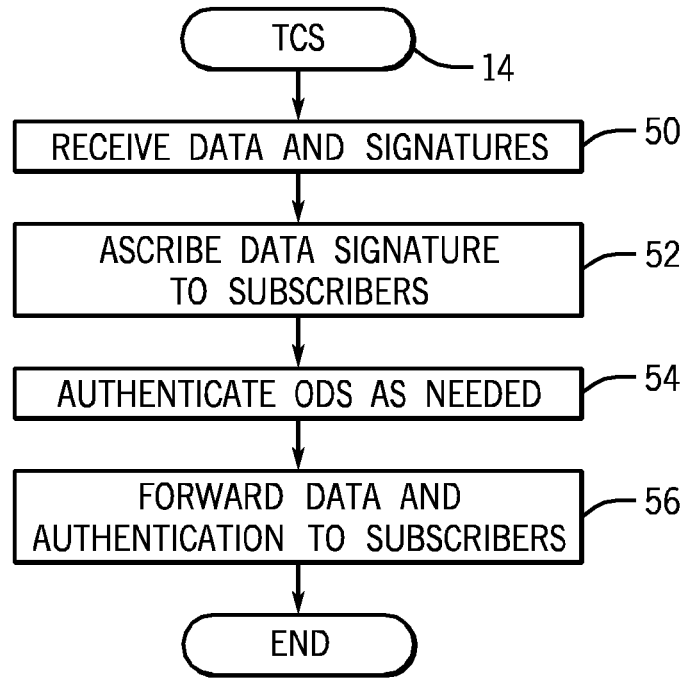
FIG. 4 is a flow chart for a trusted cloud service according to one embodiment.

Referring to FIG. 4, the trusted cloud service 14 may be implemented by a software, firmware and/or hardware sequence. In software and firmware embodiments it may be implemented by computer executed instructions stored in a non-transitory computer readable medium such as an optical, magnetic or semiconductor memory.

In some embodiments the sequence may begin by receiving data and signatures from the onboard data service as indicated in block 50. The data and the EPID signatures may then be ascribed to various subscribers as indicated in block 52. In some cases, the onboard data service may be authenticated as needed as indicated in block 54.

Then the data and authentication may be forwarded to the appropriate subscribers as indicated in block 56. Again this may be done using identifiers that indicate who the appropriate subscriber is as the data comes from the onboard data service or may be determined in the trusted cloud service by analyzing the type of data. In those cases, there may some type of identifier to indicate what type of data is involved so that the trusted cloud service can translate that information into which subscriber should receive the data and in what form such as with authentification, with attestation, or encrypted. Thus in some embodiments, the actual encryption of data may be done in the trusted cloud service instead of the onboard data service.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer implemented method comprising:
    collecting at a trusted service, from a vehicle, sensor data together with an attestation of the authenticity of the data, which attestation does not reveal the identity of the vehicle owner;
    identifying data from each of at least two sensors and associating said data with a subscriber of said data;
    sending sensor data from the vehicle to a server for distribution to subscribers;
    receiving a first public key from a first subscriber, encrypt different sensor data with said first public key;
    receiving a second public key from a second subscriber, encrypt different sensor data with said second public key;
    authenticating the sensor data from said vehicle at the trusted service;
    reporting the collected and authenticated sensor data from said vehicle without identifying the vehicle owner;
    sending different encrypted information to two different subscribers depending on a subscriber's authority to receive information granted by an owner of the vehicle;
    encrypting data sent to the first subscriber using said first key and encrypting data sent to the second subscriber using said second key; and
    preventing a subscriber from identifying a vehicle owner using privacy preserving public keys to verify data as coming from a pre-defined group of vehicles.

2. The method of claim 1 including collecting the data using an apparatus with an embedded private key.

3. The method of claim 2 including authenticating the collected data using a public key.

4. The method of claim 1 including proceeding an attestation with said data.

5. A non-transitory computer readable medium storing instructions to enable a computer to:
    collect at a trusted service, from a vehicle, sensor data together with an attestation of the authenticity of the data, which attestation does not reveal the identity of the vehicle owner;
    identify data from each of at least two sensors and associating said data with a subscriber of said data;
    send sensor data from the vehicle to a server for distribution to subscribers;
    receive a first public key from a first subscriber, encrypt different sensor data with said first public key;
    receive a second public key from a second subscriber, encrypt different sensor data with said second public key;
    authenticate the sensor data from said vehicle at the trusted service;
    report the collected and authenticated sensor data from said vehicle without identifying the vehicle owner;
    send different encrypted information to two different subscribers depending on a subscriber's authority to receive information granted by an owner of the vehicle;
    encrypt data sent to the first subscriber using said first key and encrypting data sent to the second subscriber using said second key; and
    prevent a subscriber from identifying a vehicle owner using privacy preserving public keys to verify data as coming from a pre-defined group of vehicles.

6. The medium of claim 5 further storing instructions to collect the data using an apparatus with an embedded private key.

7. The medium of claim 6 further storing instructions to authenticate the collected data using a public key.

8. The medium of claim 6 further storing instructions to proceed an attestation with said data.

9. An apparatus comprising:
    a device to:
    collect from a vehicle, sensor data together with an attestation of the authenticity of the data, which attestation does not reveal the identity of the vehicle owner;
    identify data from each of at least two sensors and associating said data with a subscriber of said data
    send sensor data from the vehicle to a server for distribution to subscribers;
    receive a first public key from a first subscriber, encrypt different sensor data with said first public key;
    receive a second public key from a second subscriber, encrypt different sensor data with said second public key;
    report the collected and authenticated sensor data from said vehicle without identifying the vehicle owner;
    send different encrypted information to two different subscribers depending on a subscriber's authority to receive information granted by an owner of the vehicle;
    encrypt data sent to the first subscriber using said first key and encrypting data sent to the second subscriber using said second key;
    prevent a subscriber from identifying a vehicle owner using privacy preserving public keys to verify data as coming from a pre-defined group of vehicles; and
    a private key embedded in said device.

10. The apparatus of claim 9, said device to authenticate the collected data using a public key.

* * * * *